United States Patent
Nagata et al.

(10) Patent No.: US 9,788,332 B2
(45) Date of Patent: Oct. 10, 2017

(54) RADIO BASE STATION, RADIO COMMUNICATION SYSTEM AND RADIO COMMUNICATION METHOD

(71) Applicant: NTT DOCOMO, INC., Tokyo (JP)

(72) Inventors: Satoshi Nagata, Tokyo (JP); Chongning Na, Beijing (CN); Xiaolin Hou, Beijing (CN); Atsushi Harada, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 14/896,929

(22) PCT Filed: May 27, 2014

(86) PCT No.: PCT/JP2014/063895
§ 371 (c)(1),
(2) Date: Dec. 9, 2015

(87) PCT Pub. No.: WO2014/199814
PCT Pub. Date: Dec. 18, 2014

(65) Prior Publication Data
US 2016/0143042 A1    May 19, 2016

(30) Foreign Application Priority Data

Jun. 14, 2013  (JP) ................. 2013-125407

(51) Int. Cl.
*H04W 72/08* (2009.01)
*H04W 72/04* (2009.01)
(Continued)

(52) U.S. Cl.
CPC ............ *H04W 72/082* (2013.01); *H04L 1/00* (2013.01); *H04L 5/14* (2013.01); *H04W 16/02* (2013.01);
(Continued)

(58) Field of Classification Search
CPC ............ H04W 16/02; H04W 72/0446; H04W 72/0406; H04W 72/082; H04W 92/20; H04L 5/14
See application file for complete search history.

(56) References Cited

U.S. PATENT DOCUMENTS

| | | | | |
|---|---|---|---|---|
| 2012/0257519 A1* | 10/2012 | Frank | ................. | H04L 5/0035 370/252 |
| 2013/0003578 A1* | 1/2013 | Hu | ................. | H04W 24/00 370/252 |

(Continued)

FOREIGN PATENT DOCUMENTS

| | | |
|---|---|---|
| JP | 2012-129793 A | 7/2012 |
| WO | 2011/126024 A1 | 10/2011 |

OTHER PUBLICATIONS

International Search Report issued in corresponding application No. PCT/JP2014/063895 dated Aug. 12, 2014 (2 pages).

(Continued)

*Primary Examiner* — Gbemileke J Onamuti
(74) *Attorney, Agent, or Firm* — Osha Liang LLP

(57) ABSTRACT

In order to avoid interference efficiently and control the amount of radio resources that are not used for interference avoidance, the present invention provides a radio base station connected to a neighbor radio base station via inter-radio base station interface. The radio base station has: a radio communication section that performs radio communication with a user terminal using a UL/DL configuration indicating a configuration of uplink and downlink subframes in a radio frame; an interference detecting section that measures and detects interference that the radio base station suffers from; and a selecting section that uses an interference detection result as a basis to determine which to apply to each subframe, between a resource allocation-unrestricted (Continued)

scheme and an inter-cell uplink/downlink orthogonalization scheme.

9 Claims, 13 Drawing Sheets

(51) Int. Cl.
    *H04L 5/14*     (2006.01)
    *H04W 16/02*     (2009.01)
    *H04L 1/00*     (2006.01)
    *H04W 92/20*     (2009.01)

(52) U.S. Cl.
    CPC ... *H04W 72/0406* (2013.01); *H04W 72/0446* (2013.01); *H04W 92/20* (2013.01)

(56) References Cited

U.S. PATENT DOCUMENTS

| | | | |
|---|---|---|---|
| 2013/0136074 A1 | 5/2013 | Okino | |
| 2014/0146719 A1* | 5/2014 | Gao | H04J 3/1694 370/278 |
| 2016/0050575 A1* | 2/2016 | Seo | H04W 72/04 370/252 |
| 2016/0128073 A1* | 5/2016 | Nagata | H04W 72/1226 370/280 |
| 2016/0205680 A1* | 7/2016 | Nguyen | H04W 72/0446 370/280 |

OTHER PUBLICATIONS

NTT DOCOMO; "Interference Mitigation Schemes for eIMTA"; 3GPP TSG RAN WG1 Meeting #72bis, R1-131669, Chicago, USA; Apr. 15-19, 2013 (6 pages).

New Postcom; "Considerations on issues of interference mitigation schemes"; 3GPP TSG RAN WG1 Meeting #73, R1-132199, Fukuoka, Japan; May 20-24, 2013 (4 pages).

Intel Corporation; "Discussion on backhaul signaling and inter-eNB measurements to support DL-UL interference mitigation schemes"; 3GPP TSG RAN WG1 Meeting #73, R1-132392, Fukuoka, Japan; May 20-24, 2013 (5 pages).

Fujitsu; "CSI-RS Patterns for Interference Measurements for CoMP"; 3GPP TSG-RAN wg1 #68bis, R1-121188, Jeju, Korea; Mar. 26-30, 2012 (9 pages).

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio AccessNetwork (UTRAN) (Release 7)"; Sep. 2006 (57 pages).

European Search Report issued in corresponding European Application No. 14810185.0, dated Jan. 26, 2017 (13 pages).

LG Electronics; "Backhaul Signaling Support for ICIC in Dynamic TDD UL-DL Reconfigurations"; 3GPP TSG RAN WG1 Meeting #73, R1-132227; Fukuoka, Japan; May 20-24, 2013 (5 pages).

* cited by examiner

RADIO BASE STATION, RADIO COMMUNICATION SYSTEM AND RADIO COMMUNICATION METHOD

TECHNICAL FIELD

The present invention relates to a radio base station applicable to a radio communication system supporting Time Division Duplex (TDD), such a radio communication system and a radio communication method.

BACKGROUND ART

In conventional arts, as duplex modes in radio communication systems, there are known Frequency Division Duplex (FDD) for dividing uplink (UL) and downlink (DL) by frequency and Time Division Duplex (TDD) for dividing UL and DL by time (for example, see Non-Patent Literature 1). In FDD, an uplink signal and a downlink signal are transmitted and received with the same time and different frequencies. On the other hand, in TDD, an uplink signal and a downlink signal are transmitted and received with the same frequency and different times.

In TDD of an LTE (Long Term Evolution) system, there are defined UL/DL configurations each indicating a ratio between UL subframes and DL subframes in a radio frame (see FIG. 1). In the LTE system, as illustrated in FIG. 1, seven UL/DL configurations are defined.

CITATION LIST

Non-Patent Literature

Non-Patent Literature 1: 3GPP, TR25.912 (V7.1.0), "Feasibility study for Evolved UTRA and UTRAN", September 2006

SUMMARY OF THE INVENTION

Technical Problem

Generally, UL traffic and DL traffic are given asymmetrical. And, the ratio of UL traffic to DL traffic is not fixed and varies with time and location. Accordingly, in a radio communication system supporting TDD, in view of effective use of radio resources, the UL/DL configuration illustrated in FIG. 1 is preferably not fixed and changes with time and location in accordance with fluctuation in actual traffic.

Particularly, in TDD for the LTE Advanced (LTE-A) system or later, in order to achieve effective use of radio resources, study has been made of dynamic TDD in which the transmission ratio of UL and DL is changed on a transmission point basis dynamically in the time domain. In the dynamic TDD, however, if different transmission directions are used in neighbor cells, there may occur inter-radio base station, that is, inter-cell interference, or inter-user terminal interference.

The present invention was carried out in view of the foregoing and aims to provide a radio base station, a radio communication system and a radio communication method capable of avoiding interference efficiently and controlling the amount of radio resources that are not used to avoid interference.

Solution to Problem

The present invention provides a radio base station connected to a neighbor radio base station via inter-radio base station interface, the radio base station comprising: a radio communication section that performs radio communication with a user terminal using a UL/DL configuration indicating a configuration of uplink subframes and downlink subframes in a radio frame; an interference detecting section that measures and detects interference that the radio base station suffers from; and a selecting section that uses an interference detection result as a basis to determine whether or not to apply a resource allocation-restricted inter-cell uplink/downlink orthogonalization scheme to each subframe.

Technical Advantage of the Invention

According to the present invention, it is possible to avoid interference efficiently and also possible to control the amount of radio resources that are not used to avoid interference.

DESCRIPTION OF EMBODIMENTS

Figure 1:
FIG. 1 is a diagram for illustrating an example of the UL/DL configurations.
Figure 2:
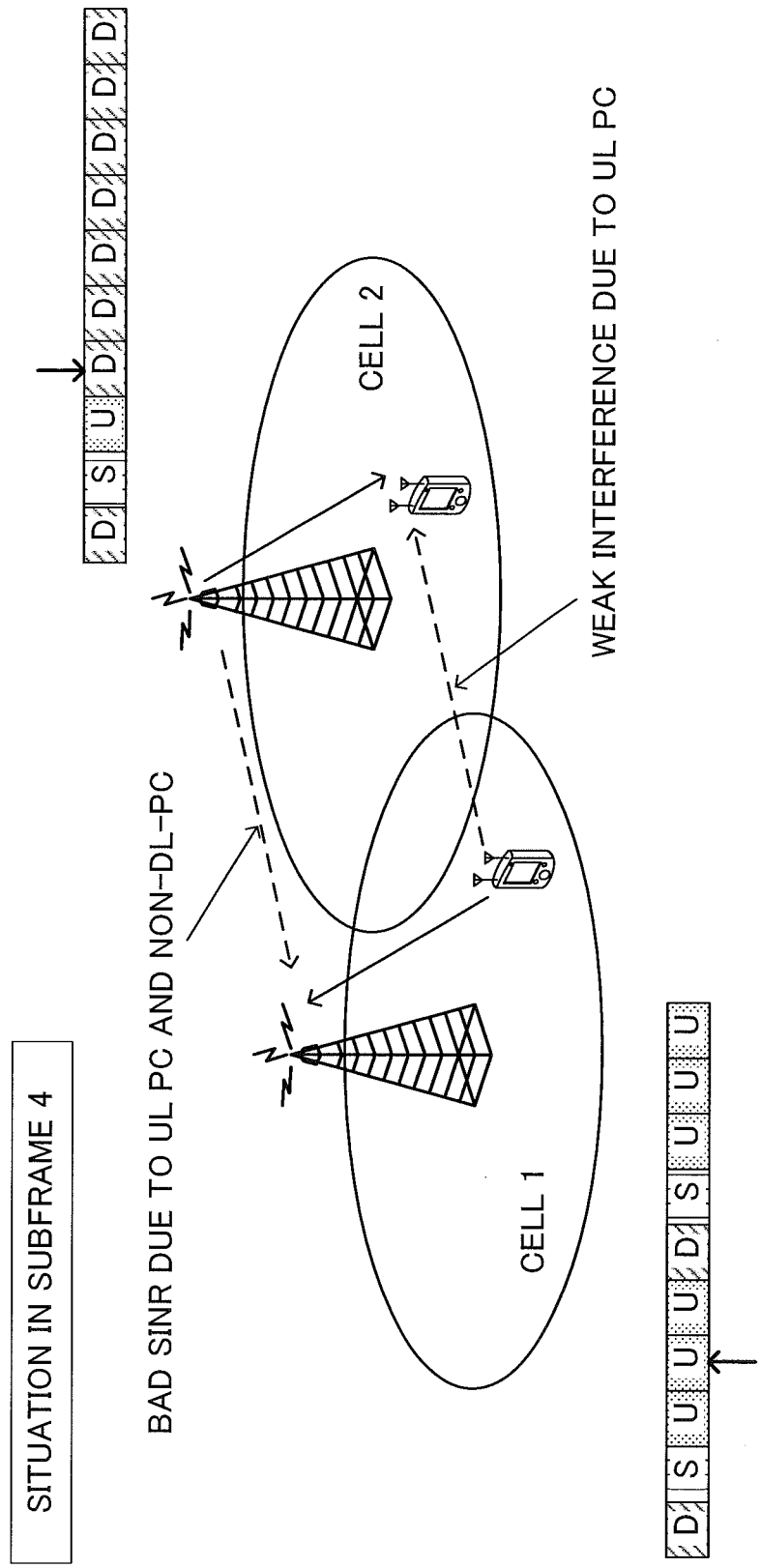
FIG. 2 is a diagram for explaining inter-cell interference.

With reference to FIG. 2, description is made about inter-cell interference in dynamic TDD.

In FIG. 2, radio communication by TDD is performed between a radio base station in cell 1 and a user terminal and between a radio base station in cell 2 and a user terminal. As an example, the cell 1 in FIG. 2 uses the UL/DL configuration 0 of much UL traffic. The cell 2 uses, as an example, the UL/DL configuration 5 of much DL traffic.

In this case, in the subframe 4, the radio base station in cell 1 performs UL transmission and the radio base station in cell 2 performs DL transmission. That is, in the same time and same frequency domain, the user terminal in cell 1 transmits an uplink signal to the radio base station and the radio base station in cell 2 transmits a downlink signal to the user terminal.

Due to this situation that the neighbor cells have different transmission directions in the same subframe, there occurs interference. UL reception by the radio base station in cell 1 is interfered by DL transmission by the radio base station in cell 2 (inter-base station interference). In addition, DL reception by the user terminal in cell 2 is interfered by UL transmission by the user terminal in cell 1 (inter-terminal interference).

As a result, in the subframe 4, the reception quality of the user terminal in cell 2 and the reception quality of the radio base station in cell 1 may be deteriorated. Generally, transmission power of a downlink signal transmitted from the radio base station is larger than the transmission power of an uplink signal transmitted from the user terminal. Therefore, the inter-base station interference given from the downlink signal transmitted from the radio base station to the uplink signal transmitted from the user terminal has particularly greater impact.

Figure 3:
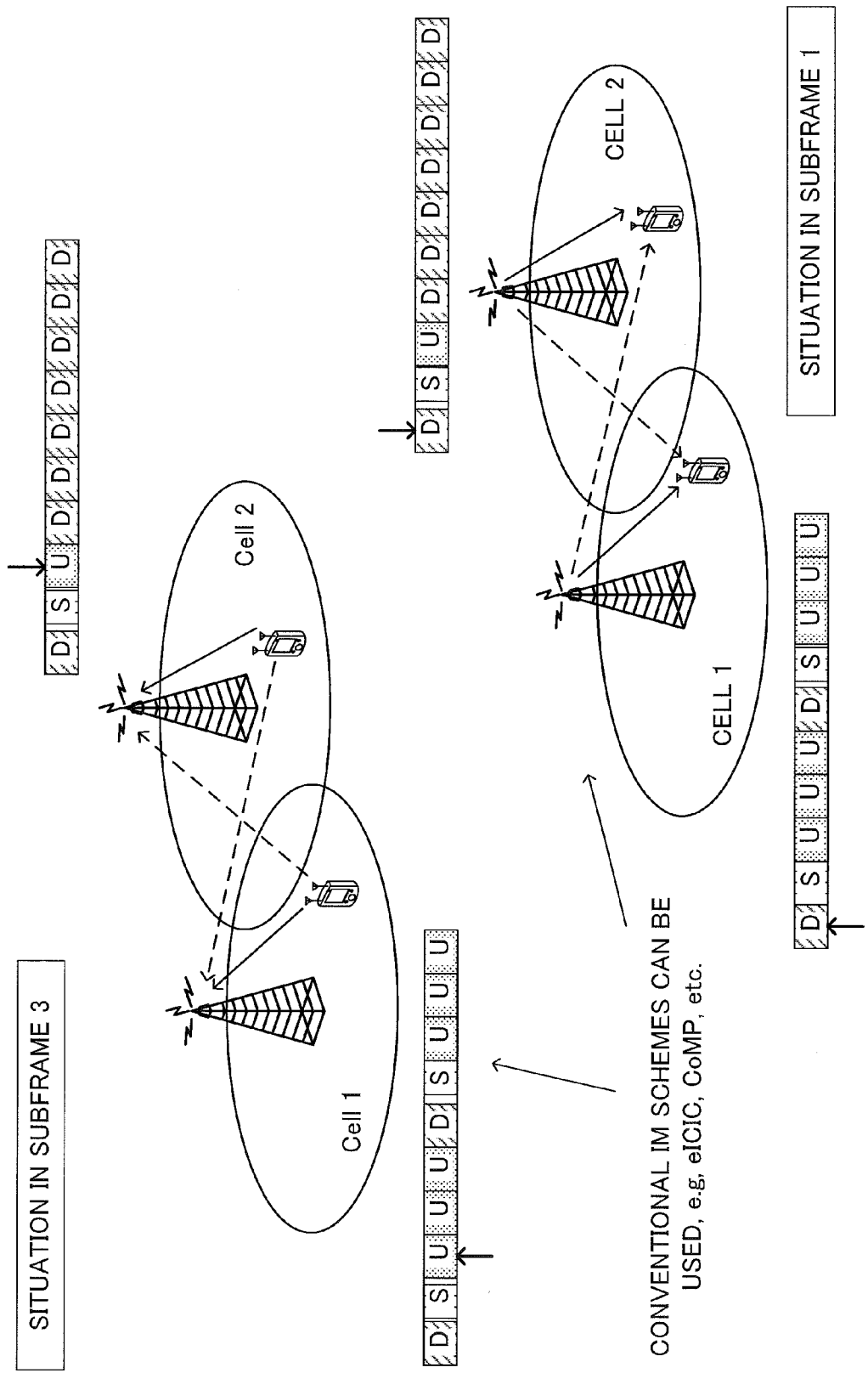
FIG. 3 is a diagram for explaining inter-cell interference.

On the other hand, as illustrated in FIG. 3, in the subframe 3, the user terminal in cell 1 and the user terminal in cell 2 both perform UL transmission. In addition, in the subframe 1, the radio base station in cell 1 and the radio base station in cell 2 both perform DL transmission. In such a case, conventional interference management designs such as eICIC (enhanced Inter-Cell Interference Coordination) and CoMP (Coordinated Multi-Point) are applicable.

In this way, in dynamic TDD, if radio base stations in neighbor cells are configured with different UL/DL configurations, the subframe (for example, subframe 4) in which the transmission direction differs between the radio base stations is greatly affected by inter-cell interference, and particularly, inter-base station interference. On the other hand, the subframe (for example, subframes 1, 3) in which the transmission direction is the same between the radio base stations is less affected by inter-base station interference.

Figure 4:
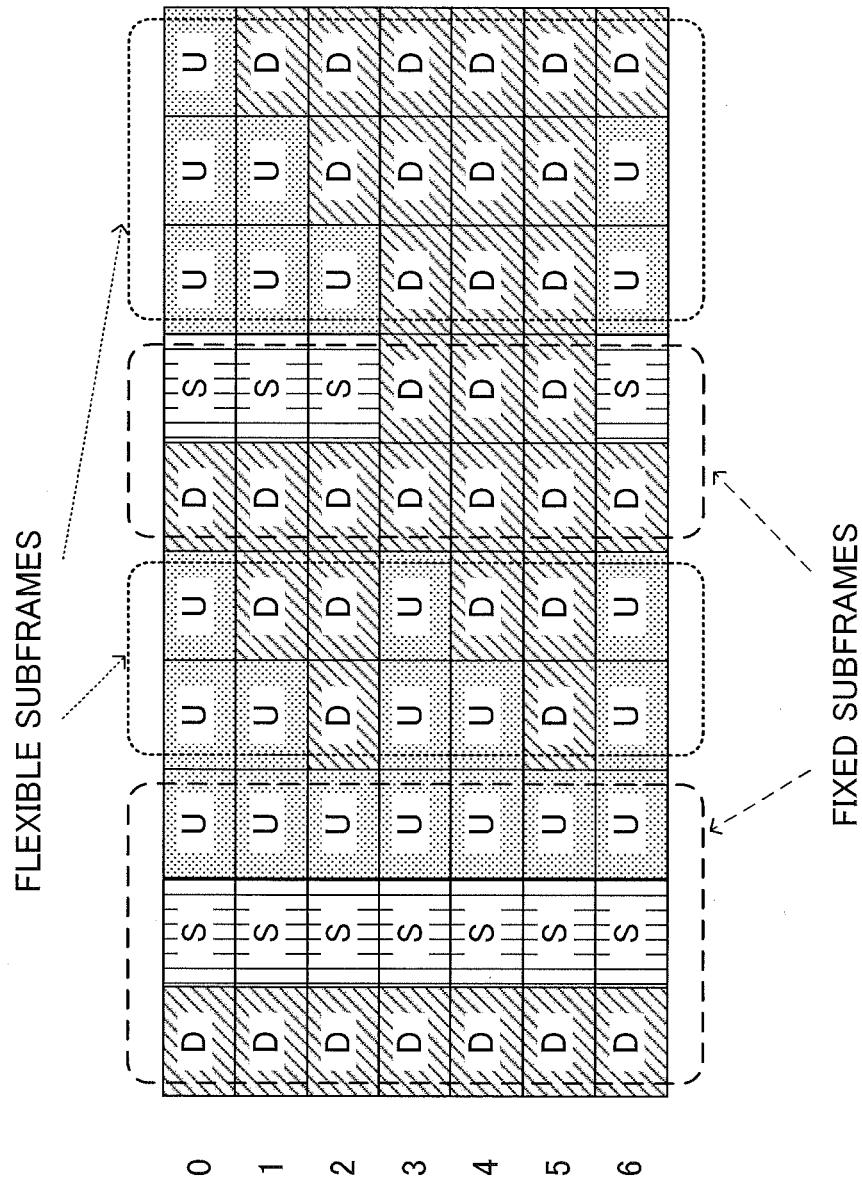
FIG. 4 is a diagram for explaining fixed and flexible subframes.

With reference to FIG. 4, description is made about the subframe that is less affected by inter-base station interference and the subframe that is much affected by inter-base station interference. As illustrated in FIG. 4, there are provided fixed subframes and flexible subframes in a radio frame. The fixed subframe is a subframe in which the transmission direction is fixed over different UL/DL configurations. The flexible subframe is a subframe in which the transmission direction is not fixed over different UL/DL configurations. Accordingly, in the flexible subframe, the transmission direction may be different between different UL/DL configurations. The flexible subframe may be called a dynamic subframe.

In FIG. 4, the subframes 0, 1, 2, 5, 6 are fixed subframes in which the transmission direction is fixed over the UL/DL configurations 0 to 6. The subframes 0, 1, 5, 6 are all configured as downlink subframes over the UL/DL configurations 0 to 6. Here, the special subframe is a subframe that is switchable between a downlink subframe and an uplink subframe, and is mainly used on downlink. Therefore, the special subframe can be regarded as a downlink subframe. Besides, the subframe 2 is configured as an uplink subframe over the UL/DL configurations 0 to 6.

Further, in FIG. 4, the subframes 3, 4, 7, 8, 9 are flexible subframes in which the transmission direction is not fixed over the UL/DL configurations 0 to 6. For example, as for the subframe 3, it is configured as an uplink subframe for the UL/DL configurations 0, 1, 3, 4, 6 and is also configured as a downlink subframe for the UL/DL configurations 2, 5 so that the uplink and downlink subframes coexist. Likewise, as for the subframes 4, 7, 8, 9, uplink and downlink subframes coexist.

In the fixed subframe, even when the radio base stations in neighbor cells are configured with different UL/DL configurations, the transmission direction is the same and there is less influence of inter-base station interference. On the other hand, in the flexible subframe, when the radio base stations in neighbor cells are configured with different UL/DL configurations, if the transmission directions are different, the inter-base station interference exerts much influence.

Here, the fixed and flexible subframes are not limited to those illustrated in FIG. 4, and may be modified appropriately in accordance with the UL/DL configuration to use.

Figure 5A:
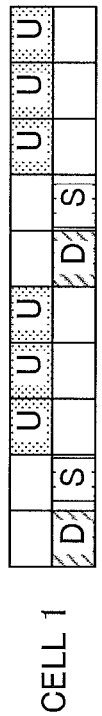
FIG. 5 provides diagrams for explaining communication schemes.
Figure 5A:
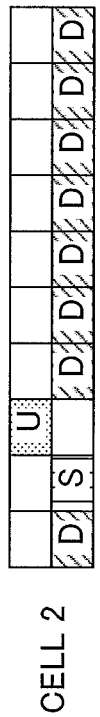
Figure 5B:
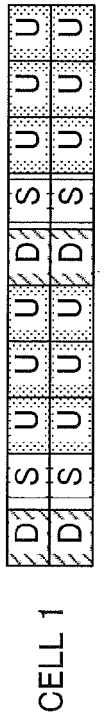
Figure 5B:
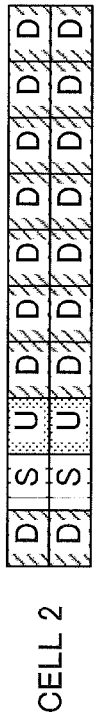

As a method for reducing such inter-cell interference, there is known restricted inter-cell uplink/downlink orthogonalization dynamic TDD based on frequency domain resource allocation as illustrated in FIG. 5B (hereinafter referred to as "inter-cell uplink/downlink orthogonalization"). In the inter-cell uplink/downlink orthogonalization dynamic TDD, UL and DL are allocated with orthogonal resources. Therefore, in the inter-cell uplink/downlink orthogonalization dynamic TDD, there is no overlap of UL subframe and DL subframe in the same frequency domain thereby to allow reduction in inter-cell interference. On the other hand, the use efficiency of resources for the inter-cell uplink/downlink orthogonalization dynamic TDD is reduced as compared with the dynamic TDD with no restriction in resource allocation as illustrated in FIG. 5A.

Figure 5C:
Figure 5C:
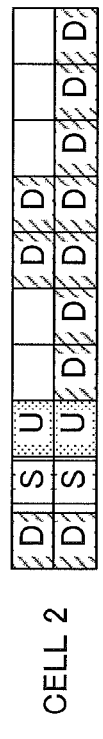

Then, there has been proposed improved inter-cell uplink/downlink orthogonalization TDD as illustrated in FIG. 5C. In the improved inter-cell uplink/downlink orthogonalization TDD, the dynamic TDD with no restriction in resource allocation is applied to the fixed subframes and inter-cell uplink/downlink orthogonalization is applied to the flexible subframes. In the improved inter-cell uplink/downlink orthogonalization TDD, the resource use efficiency is improved as compared with the inter-cell uplink/downlink orthogonalization dynamic TDD.

However, the above-mentioned method is not suitable for actual interfering situations and may contribute to unnecessary prevention of use of resources. Then, the present inventors have found the idea of interference detection inter-cell uplink/downlink orthogonalization scheme in which when strong interference is detected, the improved inter-cell uplink/downlink orthogonalization scheme is used to protect UL transmission and when the interference level is very limited or small, the dynamic TDD with no restriction in resource allocation is used to enhance the efficiency of frequency use.

The interference detection inter-cell uplink/downlink orthogonalization scheme is able to be implemented, for example, by a static configuration based on measurement of inter-base station interference. Or, the interference detection inter-cell uplink/downlink orthogonalization scheme is able to be implemented by a dynamic configuration based on instantaneous interference measurement. When the dynamic configuration is applied, the inter-base station interference may be measured directly or all interference levels may be measured. Or, two interference levels, for example, interference in fixed subframes and interference in flexible subframes may be measured respectively.

Figure 6:
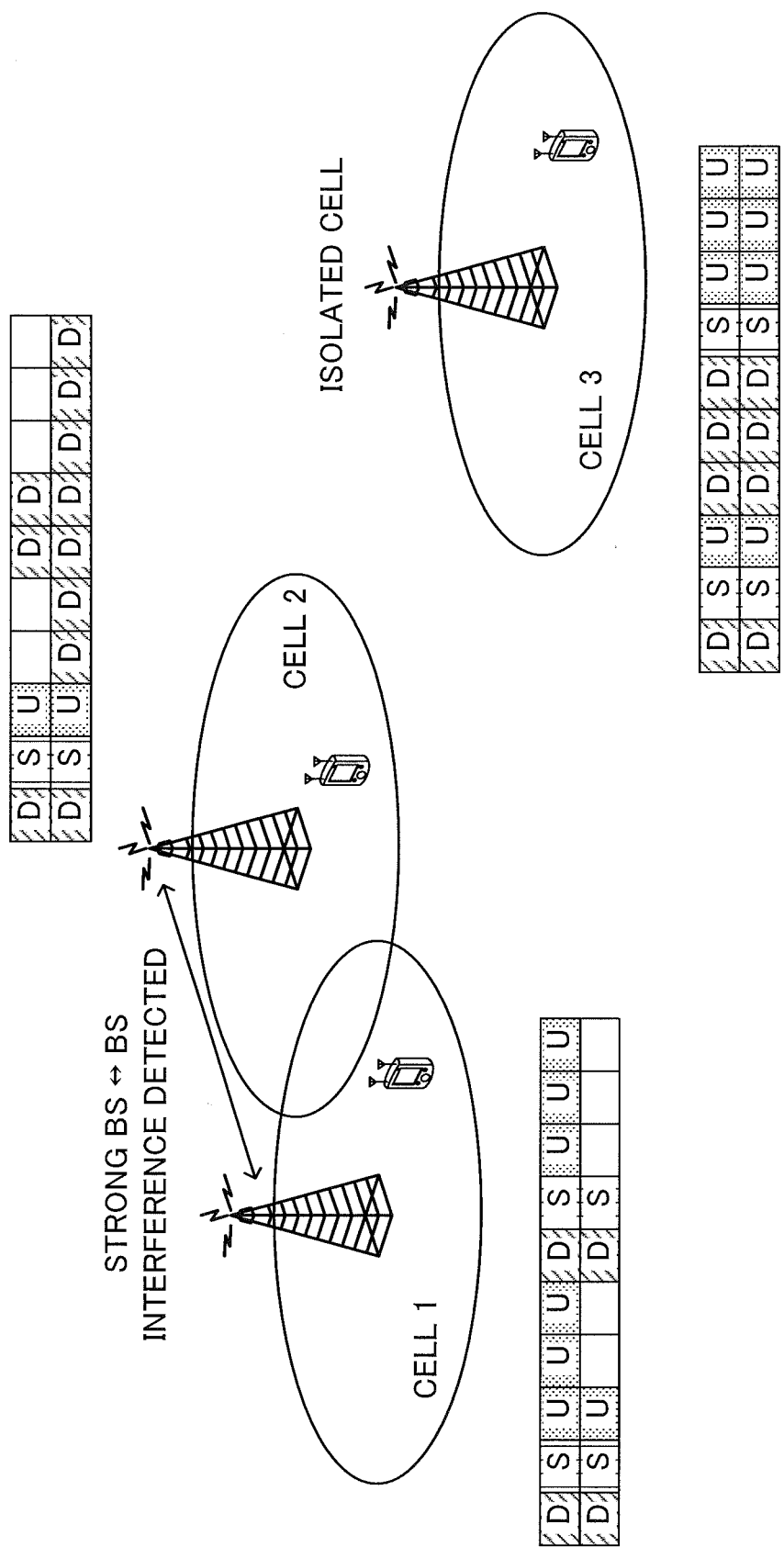
FIG. 6 is a diagram for explaining the interference detection inter-cell uplink/downlink orthogonalizing scheme according to an embodiment of the present invention.

With reference to FIG. 6, description is made about the interference detection inter-cell uplink/downlink orthogonalization scheme.

When strong inter-base station interference is detected in neighbor cells like cell 1 and cell 2 illustrated in FIG. 6, in order to prevent an uplink signal transmitted from the user terminal from being affected by the interference, the improved inter-cell uplink/downlink orthogonalization TDD is applied in the radio base stations in cell 1 and cell 2. On the other hand, when the interference level is very restricted in an isolated cell, like cell 3, in order to enhance the scheduling effect, the resource allocation-unrestricted dynamic TDD is applied in the radio base station in cell 3.

Change of the communication (resource allocation) method is performed by static or semi-static selection or by dynamic or adaptive selection. The static or semi-static selection of the communication method is described in the first embodiment and the dynamic or adaptive selection of the communication method is described in the second embodiment.

First Embodiment

In the first embodiment, description is made about static or semi-static change between the resource allocation-unrestricted scheme and the inter-cell uplink/downlink orthogonalization scheme. In the first embodiment, the radio base station measures RSRP (Reference Signal Received Power) of a neighbor radio base station and determines which communication scheme to use between the resource allocation-unrestricted scheme and inter-cell uplink/downlink orthogonalization scheme.

Figure 7:
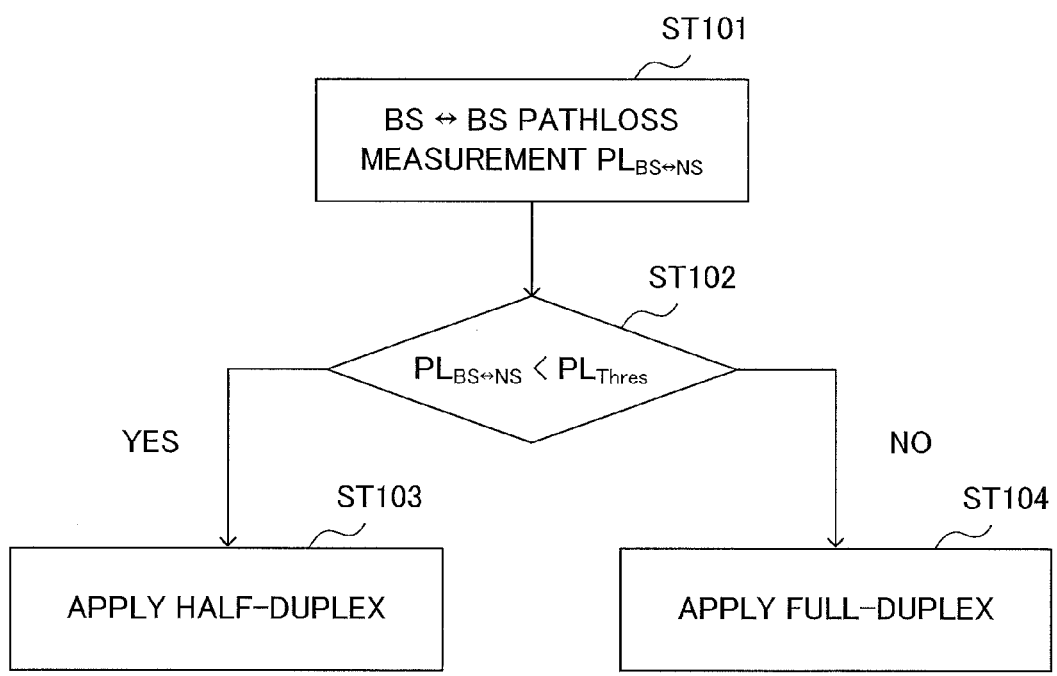
FIG. 7 is a flowchart illustrating an interference control method according to a first embodiment.

FIG. 7 is a flowchart illustrating an interference control method according to the first embodiment. First, as illustrated in FIG. 7, each radio base station measures a path loss ($PL_{BS\text{-}NS}$) between the radio base station in the subject cell and a radio base station in a neighbor cell (Step ST101). The path loss is measured based on RSRP of the neighbor cell, irrespective of whether or not the radio base station in the neighbor cell transmits data signals. Regarding whether the neighbor cell is active or not, it may be recognized by performing measurement and reconfiguration semi-statically.

For example, measurement of RSRP in the neighbor cell may use the method of HeNB (Home eNB) again, and does not affect other specifications.

Then, the measured path loss $PL_{BS\text{-}NS}$ is compared with a threshold $PL_{Thres}$ (Step ST102). Then, when the path loss $PL_{BS\text{-}NS}$ is smaller than the threshold $PL_{Thres}$ (Step ST102: yes), the inter-cell uplink/downlink orthogonalization scheme is applied (Step ST103). When the path loss $PL_{BS\text{-}NS}$ is equal to or greater than the threshold $PL_{Thres}$ (Step ST102: no), the resource allocation-unrestricted scheme is applied (Step ST104). This is because the radio base station with a smaller $PL_{BS\text{-}NS}$ receives stronger interference.

Figure 8:
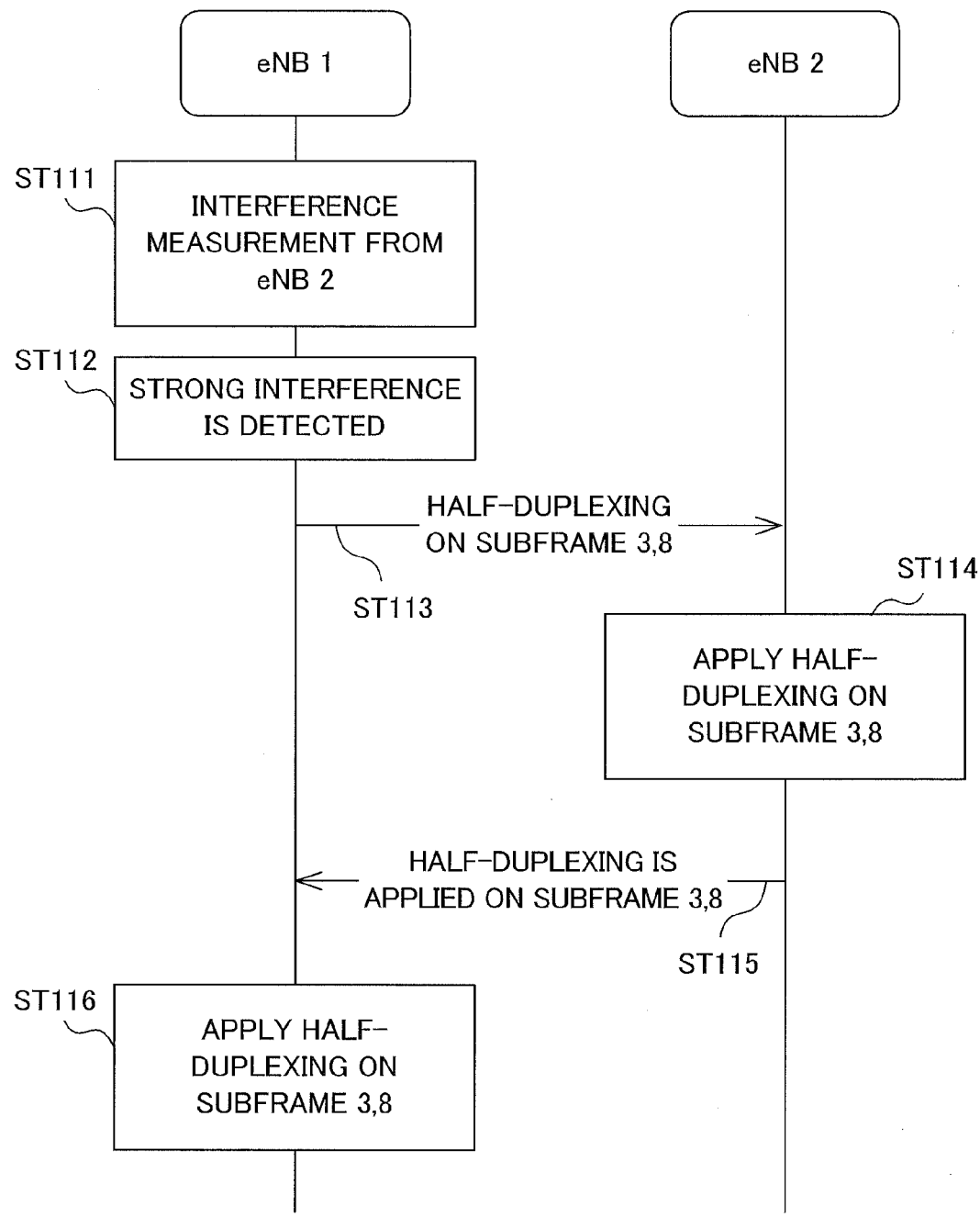
FIG. 8 is a sequence diagram illustrating the interference control method according to the first embodiment.

Here, with reference to FIG. 8, description is made about a specific example of the interference control method according to the first embodiment. First, the radio base station 1 (eNB 1) measures interference from the radio base station 2 (eNB 2) (Step ST111). When strong interference is detected (Step ST112), the radio base station 1 requests the radio base station 2 to apply the inter-cell uplink/downlink orthogonalization scheme, for example, to subframes 3, 8 (Step ST113). In response to the request, the radio base station 2 applies the inter-cell uplink/downlink orthogonalization scheme to the subframes 3, 8 (Step ST114) and signals it to the radio base station 1 (Step ST115). Then, the radio base station 1 applies the inter-cell uplink/downlink orthogonalization scheme to the subframes 3, 8 (Step ST116).

Thus, the resource allocation-unrestricted scheme and the inter-cell uplink/downlink orthogonalization scheme may be used separately on a subframe basis in the flexible subframes.

Second Embodiment

In the second embodiment, description is made about dynamic or adaptive change between the resource allocation-unrestricted scheme and the inter-cell uplink/downlink orthogonalization scheme. The interference state greatly differs between the fixed UL subframe and the flexible UL subframe. Then, as a method for detecting strong inter-base station interference, this difference is used effectively.

Figure 9:
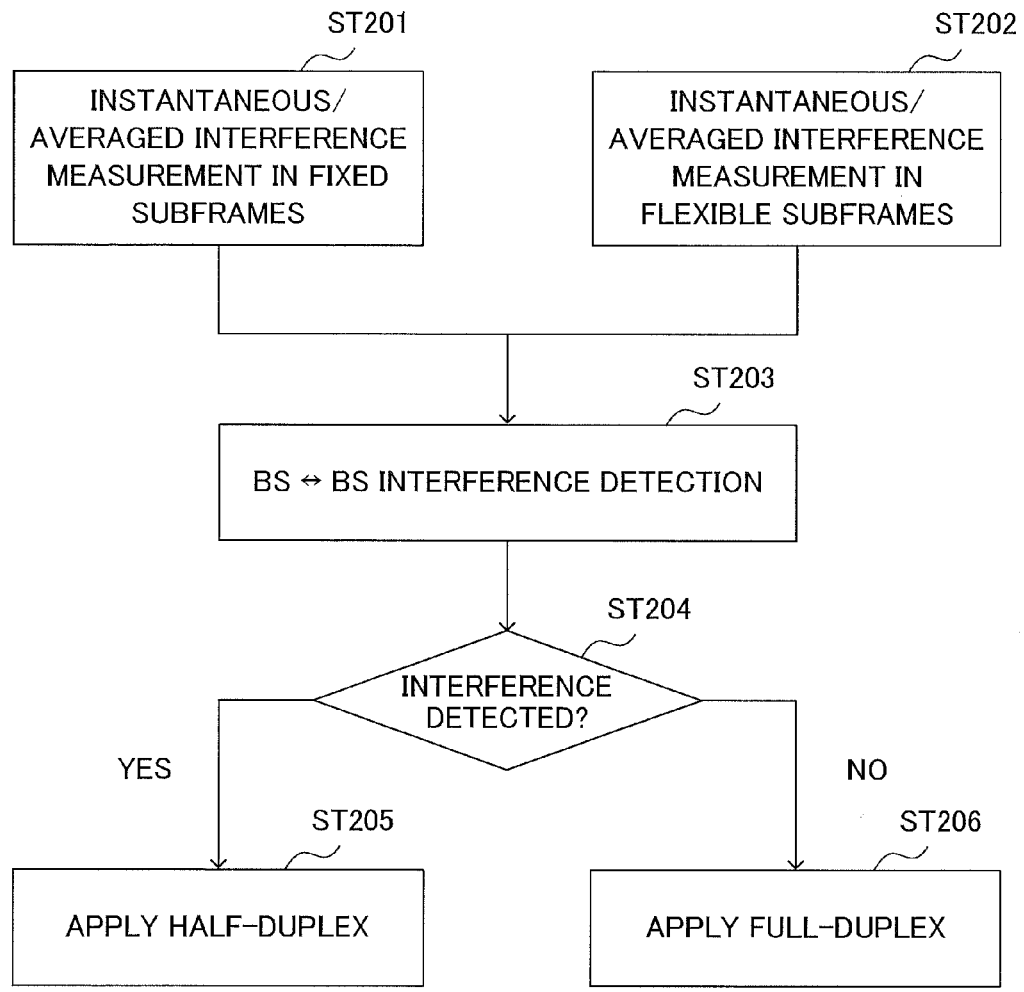
FIG. 9 is a flowchart illustrating an interference control method according to a second embodiment.

FIG. 9 is a flowchart illustrating the interference control method according to the second embodiment. As illustrated in FIG. 9, first, each radio base station measures instantaneous interference or averaged interference in fixed subframes (Step ST201). In addition, each radio base station measures instantaneous interference or averaged interference in flexible subframes (Step ST202).

At this time, the radio base station does not need to identify an interference source. In addition, the interference measurement reflects a scheduling condition of the neighbor cell. Here, the concept of CSMA/CA (Carrier Sense Multiple Access with Collision Avoidance) is applied.

Next, based on the measurement results in Step ST201, ST202, the inter-base station interference is detected (Step ST203). When inter-base station interference is detected (Step ST204: yes), the inter-cell uplink/downlink orthogonalization scheme is applied (Step ST205). When the inter-base station interference is not detected (Step ST204: no), the resource allocation-unrestricted scheme is applied (Step ST206).

For interference measurement, the radio base station measures, for example, multiple CSI (Channel State Information). In the second embodiment, the radio base station may measure CSI in at least one fixed subframe and CSI in at least one flexible subframe. Besides, the radio base station signals the selected communication scheme to the radio base station in the neighbor cell by backhaul signaling.

Figure 10:
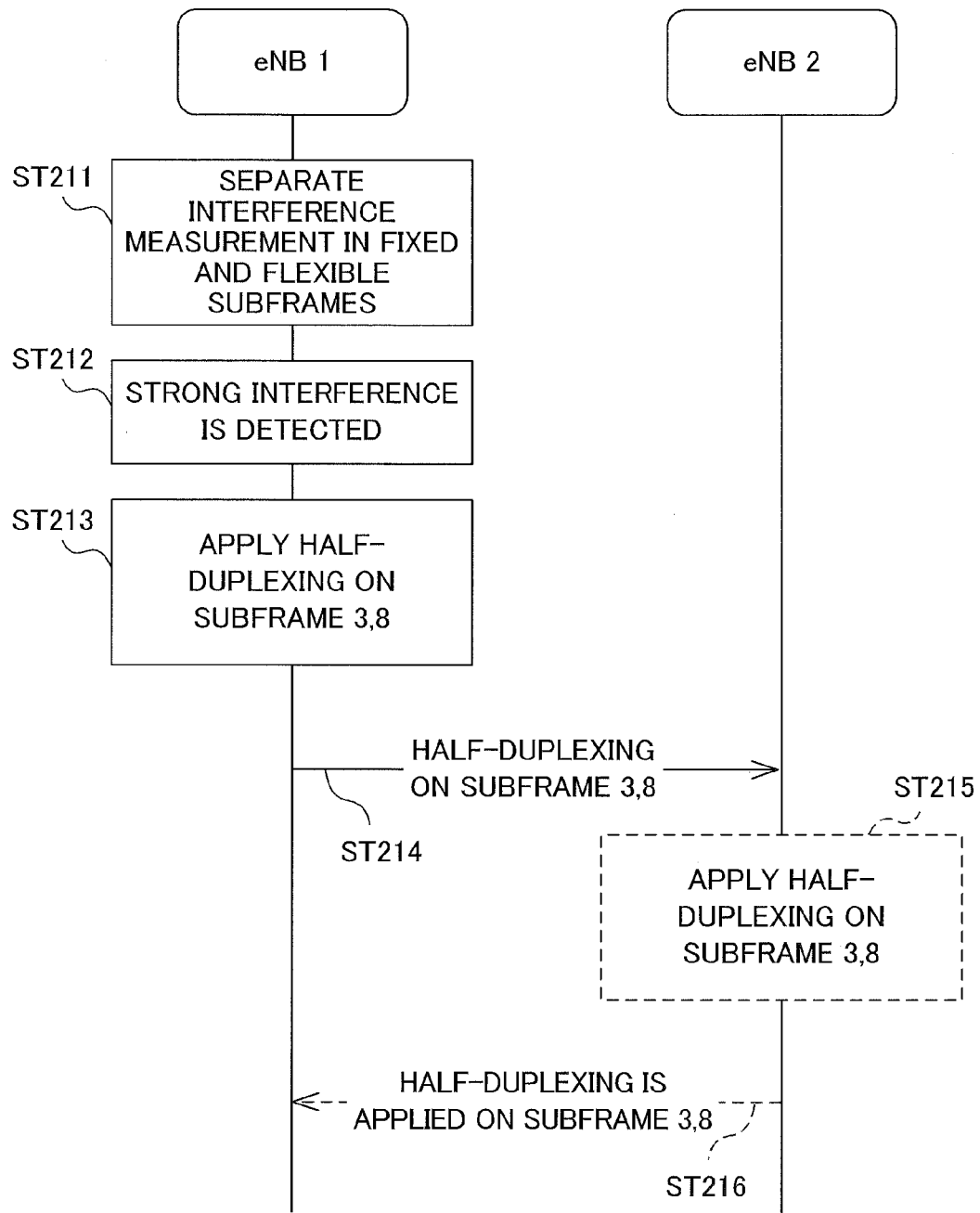
FIG. 10 is a sequence diagram illustrating the interference control method according to the second embodiment.

Here, with reference to FIG. 10, description is made about a specific example of the interference control method according to the second embodiment. First, the radio base station 1 (eNB 1) measures interference in the fixed subframe and interference in the flexible subframe, separately (Step ST211). When strong interference is detected (Step ST212), the radio base station 1 applies the inter-cell uplink/downlink orthogonalization scheme, for example, in subframes 3, 8 (Step ST213). Then, the radio base station 1 signals the application of the inter-cell uplink/downlink orthogonalization scheme to the subframes 3, 8 to the radio base station 2 (eNB 2) (Step ST214).

The radio base station 2 may apply the inter-cell uplink/downlink orthogonalization scheme to the subframes 3, 8 based on this information (Step ST215). In this case, the radio base station 2 signals, to the radio base station 1, application of the inter-cell uplink/downlink orthogonalization scheme to the subframes 3, 8 (Step ST216). Application of Steps ST215, ST216 to the radio base station 2 is not compulsory.

Next description is made about the system requirements to implement the above-mentioned first and second embodiments.

First description is made about interference measurement in each radio base station. In the first embodiment, for example, the radio base station is able to measure the interference by measuring RSRP. As the method for measuring the RSRP, the HeNB method may be used again.

In the second embodiment, the overall interference received by the radio base station is estimated by measuring interference in the flexible subframes and interference in the fixed subframes. In order to measure the interference, for example, the radio base station may measure CSI. At this time, as CSI-RS (Channel State Information Reference Signal) used in CSI measurement, the radio base station may use zero-power CSI-RS for interference measurement. The zero-power CSI-RS is a CSI-RS that is muted by allocating no transmission power to a resource.

Besides, each radio base station may measure interference assuming that inter-cell uplink/downlink orthogonalization scheme is applied to the radio base station in the neighbor cell.

Next description is made about interference control between radio base stations. The radio base stations are connected to each other via inter-base station interface such as X2 interface. Interference control between radio base stations is implemented by backhaul signaling via inter-base station interface.

First, description is made about interference control between radio base stations that is commonly adopted in the first and second embodiments. A radio base station transmits information about the following (1) to (4) to a radio base station in a neighbor cell via inter-base station interface.

(1) Information about the selection between inter-cell uplink/downlink orthogonalization scheme and the resource allocation-unrestricted scheme;

(2) Information about a subframe to which the inter-cell uplink/downlink orthogonalization scheme applies;

(3) Information about a currently used UL/DL configuration, which information is used to be able to derive a subframe to which the inter-cell uplink/downlink orthogonalization scheme is applied by the radio base station in the neighbor cell;

(4) Interference index, which index is used to be able to determine whether or not the radio base station selects the inter-cell uplink/downlink orthogonalization scheme.

In the first embodiment, the radio base station requests that a specific neighbor radio base station should be applied with the inter-cell uplink/downlink orthogonalization scheme. Regarding which radio base station to request, it can be identified by a reference signal pattern.

In the second embodiment, a radio dbase station transmits muting resource pattern information of zero-power CSI-RSs or the like to a radio base station in a neighbor cell via inter-base station interface. Based on this information, the radio base station in the neighbor cell is able to perform interference detection or estimation more accurately.

As described up to this point, by application of the interference detection inter-cell uplink/downlink orthogonalization scheme according to the present embodiment, interference to the radio base station is measured and detected, and this interference detection result is used as a basis to determine which to apply to each subframe, between the resource allocation-unrestricted scheme and the inter-cell uplink/downlink orthogonalization scheme. With this structure, it is possible to avoid inter-base station interference effectively without suppressing resource use unnecessarily.

(Configuration of Radio Communication System)

The following description is made about the configuration of a radio communication system according to the present embodiment. This radio communication system is applied with the interference control method according to the above-mentioned first or second embodiment.

Figure 11:
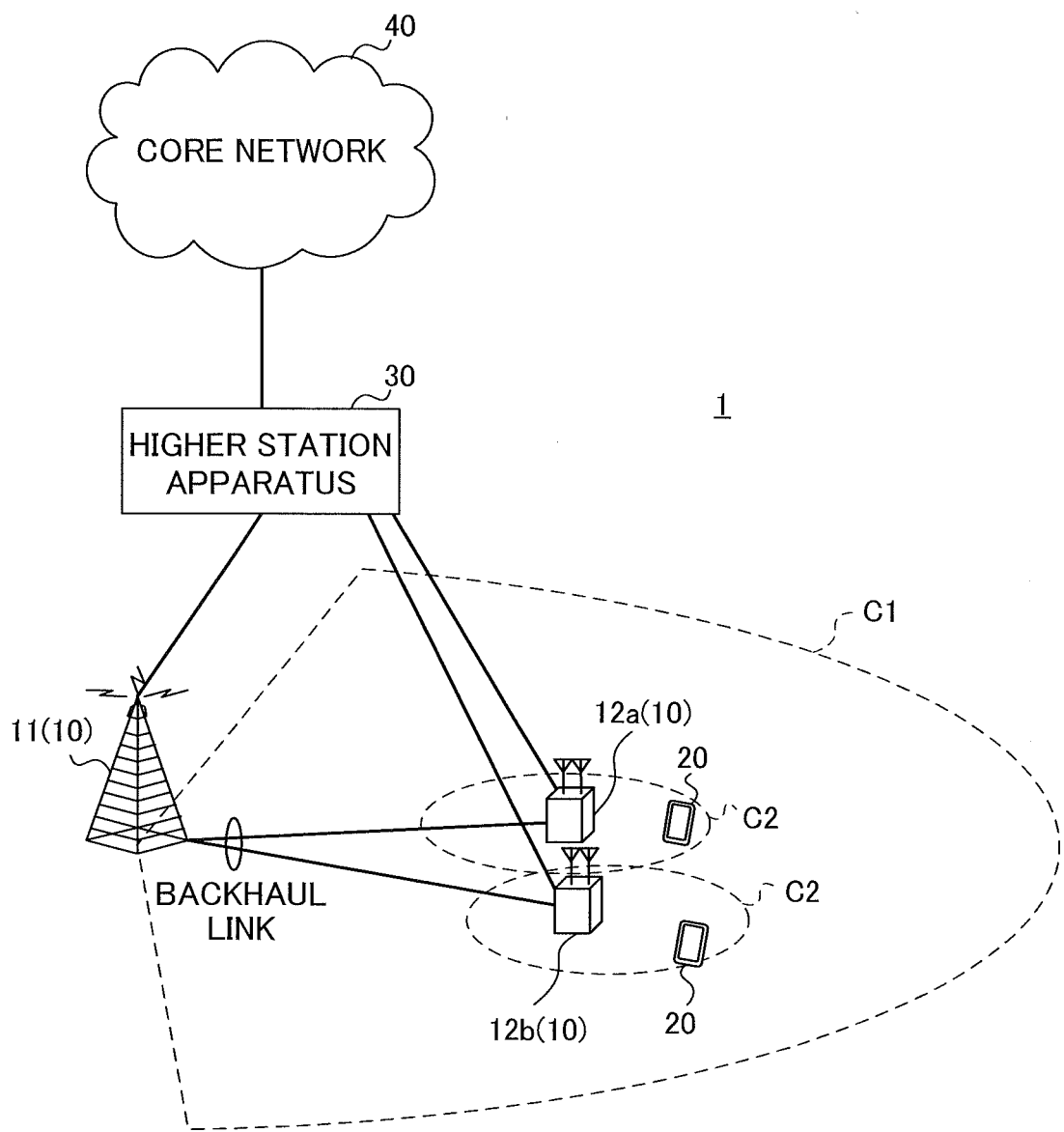
FIG. 11 is a diagram schematically illustrating an example of a radio communication system according to the present embodiment.

FIG. 11 is a diagram schematically illustrating the configuration of a radio communication system according to the present embodiment. As illustrated in FIG. 11, the radio communication system 1 includes a macro base station 11 forming a macro cell C1 as a first cell and small base stations 12 (12a, 12b) that are located within the macro cell C1 and each form a small cell C2 as a second cell that is smaller than the macro cell C1. In the macro cell C1 and small cells C2, user terminals 20 are located. Here, the macro cell C1 (macro base station 11), the small cells C2 (small base stations 12) and the user terminals 20 are not limited in number to those illustrated in FIG. 11.

In the macro cell C1 and small cells C2, the user terminals 20 are located. Each user terminal 20 is configured to be able to perform radio communication with the macro base station 11 and/or small base station 12. The user terminal 20 is also able to communicate with a plurality of small base stations 12 by aggregating component carriers used in each small cell C2 (carrier aggregation). Or, the user terminal 20 is able to communicate with the macro base station 11 and small base station 12 by aggregating component carriers used in the macro cell C1 and component carriers used in the small cell C2.

Communication between the user terminal 20 and the macro base station 11 is performed using a carrier of relatively low frequency band (for example, 2 GHz). On the other hand, communication between the user terminal 20 and the small base station 12 is performed using a carrier of relatively high frequency band (for example, 3.5 GHz), but the carrier is not limited to this. Communication with the macro base station 11 may be performed with the same frequency band as communication with the small base station 12.

In addition, the macro base station 11 and each small base station 12 may be connected by a relatively low-speed (middle delay) link such as X2 interface (Non-Ideal backhaul) or by a relatively high-speed (low delay) link such as an optical fiber (Ideal backhaul) or by any radio link. The small base stations 12 are also connected to each other by a relatively low-speed (middle delay) link such as X2 interface (Non-Ideal backhaul) or by a relatively high-speed (low delay) link such as an optical fiber (Ideal backhaul) or by any radio link.

The macro base station 11 and the small base stations 12 are each connected to a higher station apparatus 30 and also to a core network 40 via the higher station apparatus 30. The higher station apparatus 30 includes, but is not limited to, for example, an access gateway apparatus, a radio network controller (RNC) and a mobility management entity (MME).

The macro base station 11 is a radio base station having a relatively wide coverage area and may be called eNodeB (eNB), radio base station, transmission point or the like. The small base station 12 is a radio base station having a local coverage area and may be called RRH (Remote Radio Head), pico base station, femto base station, Home eNodeB (HeNB), transmission point, eNodeB (eNB) or the like. The user terminal 20 is a terminal supporting various communication schemes such as LTE, LTE-A and may include not only a mobile communication terminal but also fixed or stationary communication terminal.

The radio communication system 1 is applied, as a duplex scheme, with time division duplex (TDD) in which time is divided by uplink and downlink. The radio communication system 1 also uses the UL/DL configuration that indicates a ratio of uplink and downlink subframes in a radio frame.

In the radio communication system 1, used as downlink channels are a downlink shared channel (PDSCH: Physical Downlink Shared Channel) that is used by each user terminal 20 on a shared basis, a downlink control channel (PDCCH: Physical Downlink Control Channel, EPDCCH: Enhanced Physical Downlink Control Channel), PCFICH, PHICH, and a broadcast channel (PBCH). The PDSCH is used to transmit user data and higher layer control information. PDCCH and EPDCC are used to transmit downlink control information (DCI).

In the radio communication system 1, used as uplink communication channels are an uplink shared channel (PUSCH: Physical Uplink Shared Channel) that is used by each user terminal 20 on a shared basis, an uplink control channel (PUCCH: Physical Uplink Control Channel) and the like. The PUSCH is used to transmit user data and higher layer control information. And, the PUCCH is used to transmit downlink radio quality information (CQI: Channel Quality Indicator), transmission acknowledgement information (ACK/NACK) and so on.

Figure 12:
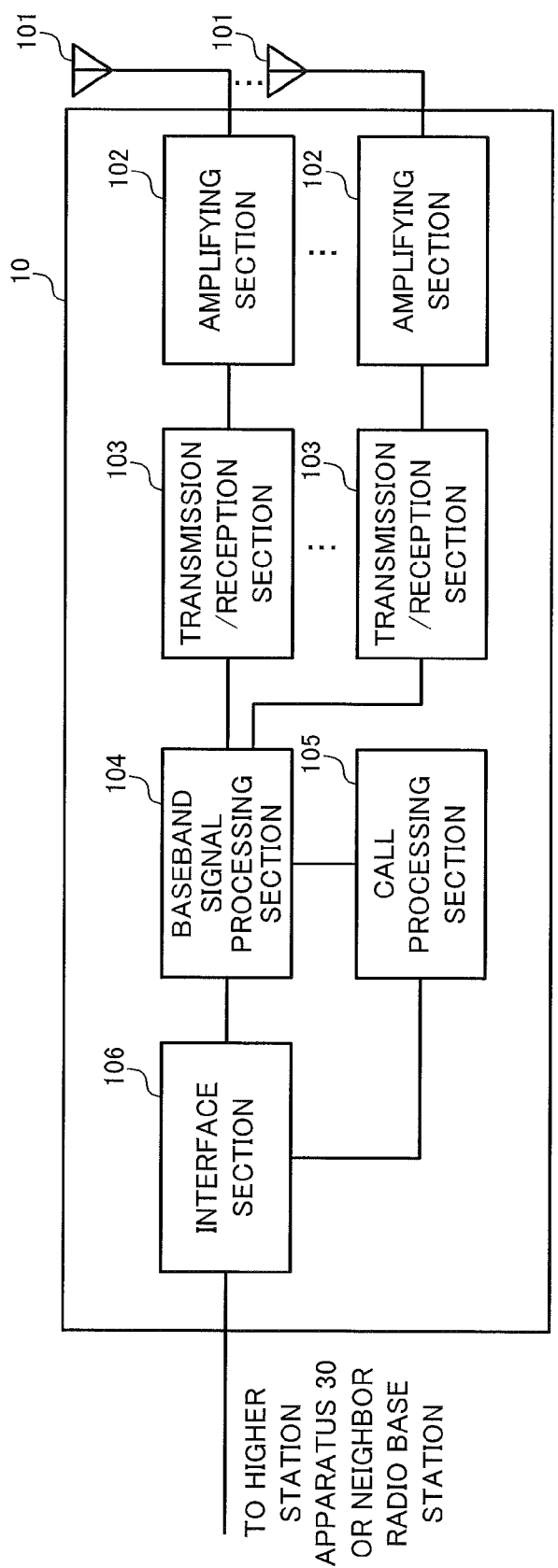
FIG. 12 is a diagram for explaining the overall configuration of a radio base station according to the present embodiment.

FIG. 12 is a diagram illustrating the entire configuration of the radio base station 10 (including radio base stations 11 and 12) according to the present embodiment. The radio base station 10 has a plurality of transmission/reception antennas 101 for MIMO transmission, amplifying sections 102, transmission/reception sections 103, a baseband signal processing section 104, a call processing section 105 and an interface section 106.

User data transmitted from the radio base station 10 to a user terminal 20 on downlink is input from the higher station apparatus 30 to the baseband signal processing section 104 via the interface section 106.

In the baseband signal processing section 104, signals are subjected to PDCP layer processing, RLC (Radio Link Control) layer transmission processing such as division and coupling of user data and RLC retransmission control transmission processing, MAC (Medium Access Control) retransmission control, including, for example, HARQ transmission processing, scheduling, transport format selection, channel coding, inverse fast Fourier transform (IFFT) processing, and precoding processing, and are transferred to each transmission/reception section 103. As for downlink control channel signals, transmission processing is performed, including channel coding and inverse fast Fourier transform, and resultant signals are transferred to each transmission/reception section 103.

Each transmission/reception section 103 receives baseband signals that are precoded per antenna and output from the baseband signal processing section 104 and converts the signals into a radio frequency band. Each amplifying section 102 amplifies frequency-converted radio frequency signals, which are then transmitted from each transmission/reception antenna 101.

Meanwhile, as for data transmitted from the user terminal 20 to the radio base station 10 on uplink, radio frequency signals received by each transmission/reception antenna 101 are amplified by each amplifying section 102, subjected to frequency conversion in each transmission/reception section 103 and converted into baseband signals and the converted signals are then input to the baseband signal processing section 104.

The baseband signal processing section 104 performs FFT (Fast Fourier Transform) processing, IDFT (Inverse Discrete Fourier Transform) processing, error correction decoding, MAC retransmission control reception processing, and RLC layer and PDCP layer reception processing on user data included in the input baseband signals. The signals are then transferred to the higher station apparatus 30 via the interface section 106. The call processing section 105 performs call processing such as setting up and releasing of a communication channel, manages the state of the radio base station 10 and manages the radio resources.

The interface section 106 performs transmission and reception of signals with a neighbor radio base station via inter-radio base station interface such as X2 interface. Or, the interface section 106 performs transmission and reception of signals with the higher station apparatus 30 via given interface.

Figure 13:
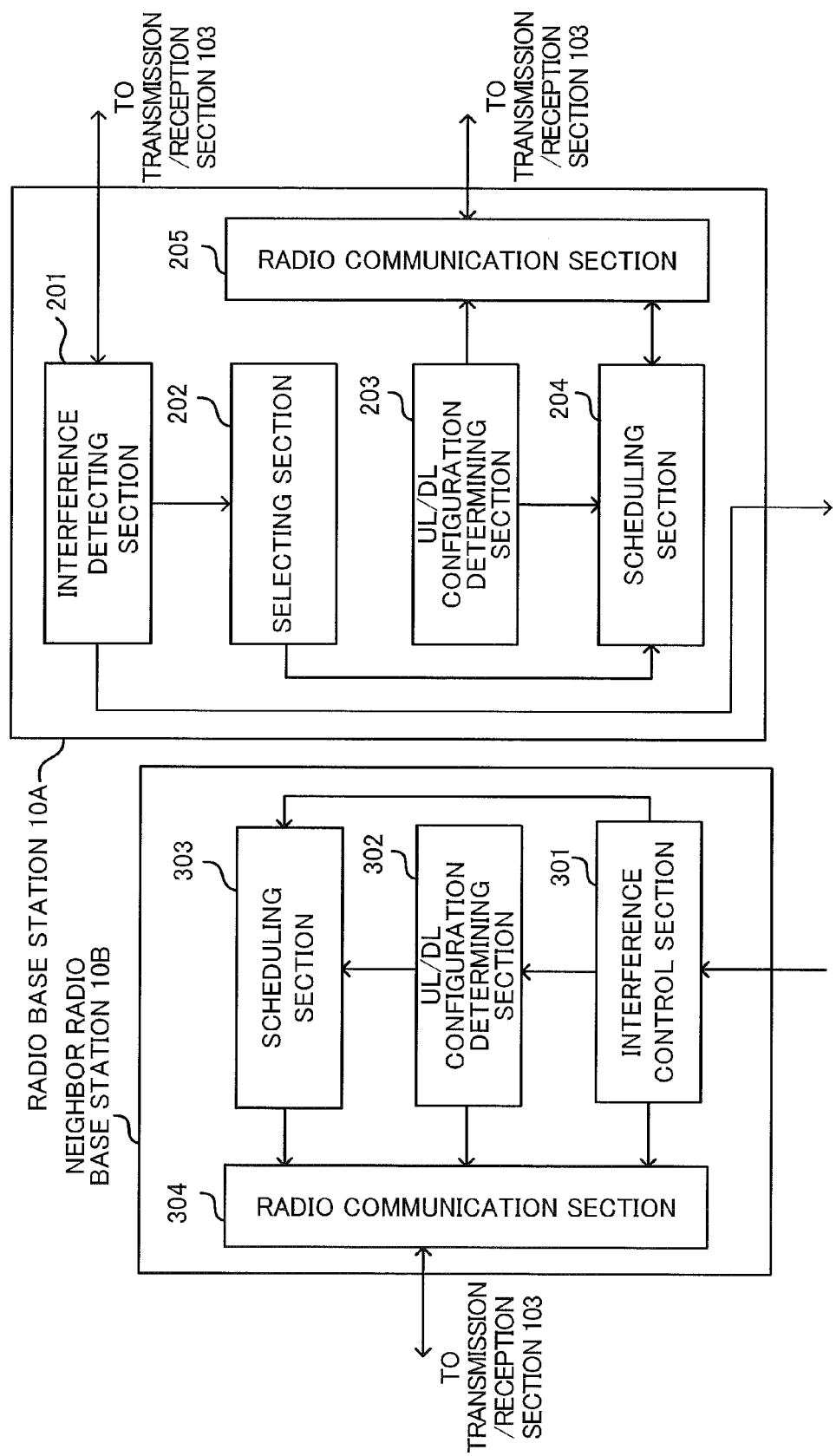
FIG. 13 is a diagram for explaining the functional structure of the radio base station according to the present embodiment.

FIG. 13 is a diagram illustrating a main functional structure of the baseband signal processing section 104 provided in the radio base station 10 according to the present embodiment. In FIG. 13, functional structures of the radio base station 10a and the neighbor radio base station 10b are described separately for convenience of explanation, but, these functional structures may be provided in one radio base station 10. The radio base station 10a and neighbor radio base station 10b may be two macro base stations 11, two small base stations 12, or combination of one macro base station 11 and one small base station 12.

As illustrated in FIG. 13, the radio base station 10a has an interference detecting section 201, a selecting section 202, an UL/DL configuration determining section 203, a scheduling section 204 and a radio communication section 205.

The interference detecting section 201 measures and detects interference that the radio base station 10a suffers from. The interference detecting section 201 measures interference, for example, by measuring RSRP of the neighbor radio base station 10b. In addition, the interference detecting section 201 estimates overall interference that the radio base station 10a suffers from, for example, by measuring interference in each of fixed and flexible subframes. Or, the interference detecting section 201 measures interference by assuming that the neighbor radio base station 10b is applied with the inter-cell uplink/downlink orthogonalization scheme.

The selecting section 202 selects which to apply to each subframe, between the resource allocation-unrestricted scheme and the inter-cell uplink/downlink orthogonalization scheme, based on an interference detection result in the interference detecting section 201. Specifically, when strong interference is detected in the interference detecting section 201, the selecting section 202 applies the inter-cell uplink/downlink orthogonalization scheme.

Or, the selecting section 202 selects the resource allocation-unrestricted scheme for all fixed subframes in the UL/DL configuration and also selects either the resource allocation-unrestricted scheme or the inter-cell uplink/downlink orthogonalization scheme to each flexible subframe in the UL/DL configuration.

The communication scheme to apply to each subframe selected by the selecting section 202 is transmitted to the neighbor radio base station 10b from the interface section 106. Or, a request for application of the inter-cell uplink/downlink orthogonalization scheme based on the communication scheme to apply to each subframe is transmitted from the interface section 106 to the neighbor radio base station 10b. Or, the muting resource pattern information of zero-power CSI-RSs or the like is transmitted from the interface section 106 to the neighbor radio base station 10b.

The UL/DL configuration determining section 203 determines a UL/DL configuration to use for radio communication with the user terminal 20. The UL/DL configuration determining section 203 may determine the UL/DL configuration based on traffic information dynamically or semi-statically. The determined UL/DL configuration is provided to the user terminal 20, for example, by the downlink control channel (PDCCH, EPDCCH) broadcast channel (PBCH), SIB (System Information Block) or RRC signaling.

The scheduling section 204 performs allocation radio resources to the user terminal 20, that is, scheduling, based on the communication scheme selected in the selecting section 202.

The radio communication section 205 performs radio communication with the user terminal 20 by using the communication scheme selected in the selecting section 202 and the UL/DL configuration determined in the UL/DL configuration determining section 203. Specifically, the radio communication section 205 performs transmission processing of downlink signals to the user terminal 20, including coding and modulation, in accordance with a scheduling result in the scheduling section 204. Or, the radio communication section 205 performs reception processing of uplink signals from the user terminal 20, including demodulation and decoding.

On the other hand, the neighbor radio base station 10b includes an interference control section 301, a UL/DL configuration determining section 302, a scheduling section 303 and a radio communication section 304.

The interference control section 301 performs interference control by applying either the resource allocation-unrestricted scheme or the inter-cell uplink/downlink orthogonalization scheme, based on information about the communication scheme transmitted from the radio base station 10a.

The UL/DL configuration determining section 302 determines a UL/DL configuration used in radio communication with the user terminal 20. The UL/DL configuration determining section 302 may determine the UL/DL configuration based on instruction information from the interference control section 301, traffic information or the like, dynamically or semi-statically. The determined UL/DL configuration is provided to the user terminal 20, for example, by the downlink control channel (PDCCH, EPDCCH), broadcast channel (PBCH), SIB (System Information Block), RRC signaling or the like.

The scheduling section 303 performs allocation of radio resources to the user terminal 20, that is, scheduling, based on instruction information from the interference control section 301 and so on.

The radio communication section 304 performs radio communication with the user terminal 202 using the communication scheme selected in the interference control section 301 and the UL/DL configuration determined in the UL/DL configuration determining section 302. Specifically, the radio communication section 304 performs transmission processing of downlink signals to the user terminal 20, including coding and modulation, in accordance with a scheduling result by the scheduling section 303. The radio communication section 304 performs reception processing of uplink signals from the user terminal 20, including demodulation and decoding.

As described up to this point, in the radio communication system 1 according to the present embodiment, either of the resource allocation-unrestricted scheme or the inter-cell uplink/downlink orthogonalization scheme is selected for each subframe, based on an interference detection result in the radio base station 10a. Information about this communication scheme is signaled from the radio base station 10a to the neighbor radio base station 10b via inter-base station interface. With this structure, it is possible to reduce influence of inter-cell interference.

Up to this point, the present invention has been described in detail by way of the above-described embodiments. However, a person of ordinary skill in the art would understand that the present invention is not limited to the embodiments described in this description. The present invention could be embodied in various modified or altered forms without departing from the gist or scope of the present invention defined by the claims. For example, the above-described plural embodiments may be adopted in combination. Therefore, the statement in this description has been made for the illustrative purpose only and not to impose any restriction to the present invention.

The disclosure of Japanese Patent Application No. 2013-125407 filed on Jun. 14, 2013, including the specification, drawings, and abstract, is incorporated herein by reference in its entirety.

The invention claimed is:

1. A radio base station connected to a neighbor radio base station via inter-radio base station interface, the radio base station comprising:
   a processor and a memory, wherein the processor:
      performs radio communication with a user terminal using a UL/DL configuration indicating a configuration of uplink and downlink subframes in a radio frame;
      measures and detects interference that the radio base station suffers from; and
      uses a result of a detection of the interference as a basis to determine which of two schemes is applied to at least one frequency domain resource allocation in each subframe,
   wherein one of the scheme has a restriction that an uplink subframe and a downlink subframe do not overlap each other in a same frequency domain resource, and the other scheme does not have the restriction, and
   wherein, if the measured interference is stronger than a threshold value, the processor determines to apply the restriction to each flexible subframe in the UL/DL configuration.

2. The radio base station according to claim 1, wherein the processor measures the interference by measuring Reference Signal Received Power (RSRP) of the neighbor radio base station.

3. The radio base station according to claim 1, wherein the processor measures all the interference that the radio base station suffers from by measuring interference in a fixed subframe and measuring interference in a flexible subframe.

4. The radio base station according to claim 1, wherein the processor measures the interference by assuming that the restriction is applied in the neighbor radio base station.

5. The radio base station according to claim 1, wherein the processor transmits information indicating whether or not to apply the restriction to each subframe to the neighbor radio base station via the inter-radio base station interface.

6. The radio base station according to claim 1, wherein the processor transmits a request to apply the restriction based on the determination whether or not to apply the restriction to each subframe to the neighbor radio base station via the inter-radio base station interface.

7. The radio base station according to claim 1, wherein the processor transmits muting resource pattern information to the neighbor radio base station via the inter-radio base station interface.

8. A radio communication system in which a radio base station is connected to a neighbor radio base station via inter-radio base station interface, the radio communication system comprising:
   the radio base station comprising a first processor and a first memory, wherein the first processor:

performs radio communication with a user terminal using a UL/DL configuration indicating a configuration of uplink and downlink subframes in a radio frame;

measures and detects interference that the radio base station suffers from;

uses a result of a detection of the interference as a basis to determine which of two schemes is applied to at least one frequency domain resource allocation in each subframe, wherein one of the schemes has a restriction that an uplink subframe and a downlink subframe do not overlap each other in a same frequency domain resource, and the other scheme does not have the restriction; and transmits information indicating whether or not to apply the restriction to each subframe to the neighbor radio base station via the inter-radio base station interface; and the neighbor radio base station comprising a second processor and a second memory, wherein the second processor:

receives the information from the radio base station; and uses the information as a basis to perform interference control by applying or not applying the restriction to each subframe, wherein, if the measured interference is stronger than a threshold value, the processor determines to apply the restriction to each flexible subframe in the UL/DL configuration.

9. A radio communication method for a radio base station that is connected to a neighbor radio base station via inter-radio base station interface, the radio communication method comprising:

performing radio communication with a user terminal using a UL/DL configuration indicating a configuration of uplink and downlink subframes in a radio frame;

measuring and detecting interference that the radio base station suffers from; and using a result of the measuring and the detecting as a basis to determine which of two schemes is applied to at least one frequency domain resource allocation in each subframe, wherein one of the schemes has a restriction that an uplink subframe and a downlink subframe do not overlap each other in a same frequency domain resource, and the other scheme does not have the restriction, wherein, if the measured interference is stronger than a threshold value, the radio base station determines to apply the restriction to each flexible subframe in the UL/DL configuration.

* * * * *